UNITED STATES PATENT OFFICE.

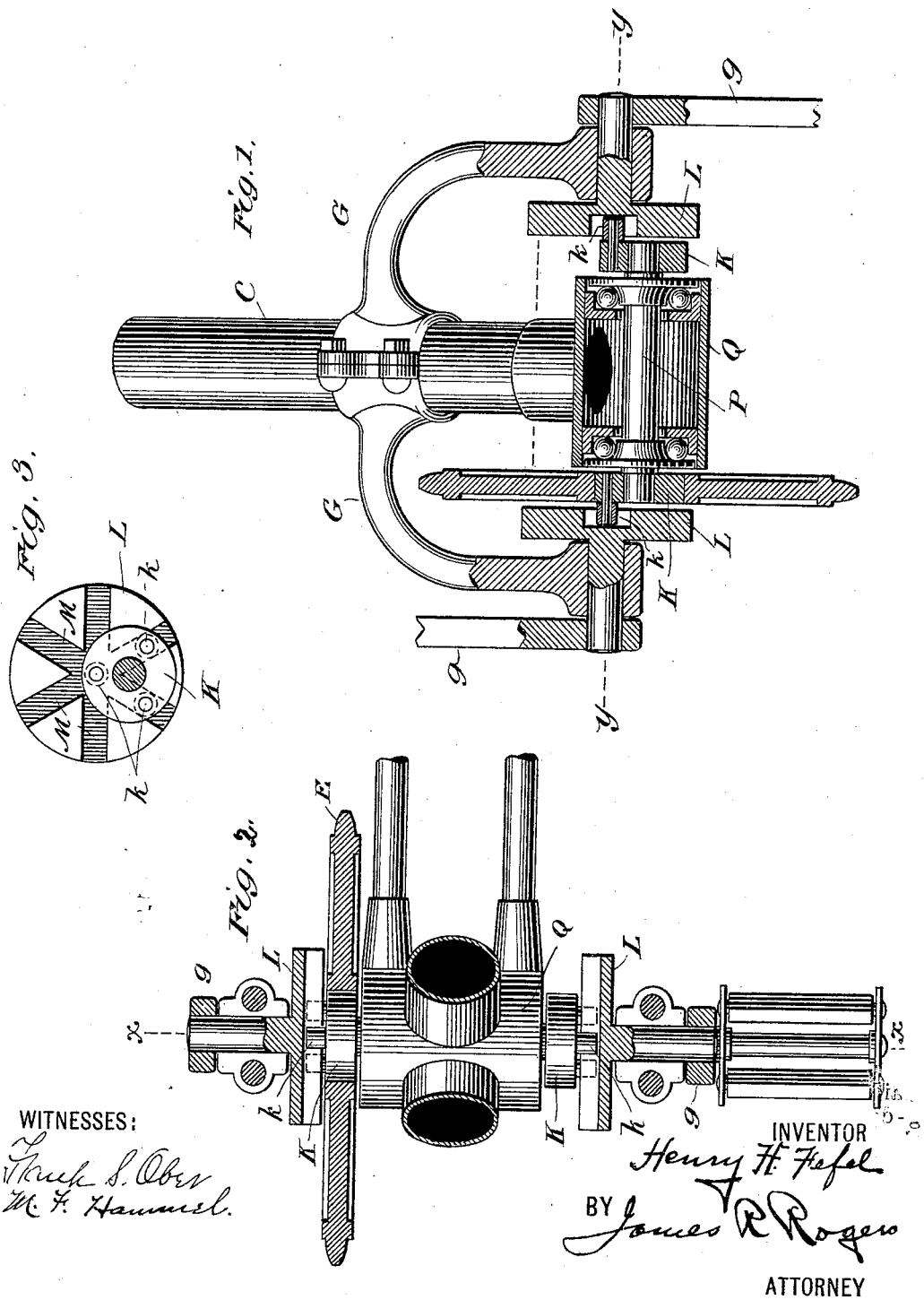

HENRY H. FEFEL, OF NEW YORK, N. Y., ASSIGNOR TO THE MULTIPLE POWER COMPANY, OF WEST VIRGINIA.

DRIVING MECHANISM FOR BICYCLES.

SPECIFICATION forming part of Letters Patent No. 611,779, dated October 4, 1898.

Application filed November 16, 1896. Serial No. 612,336. (No model.)

*To all whom it may concern:*

Be it known that I, HENRY H. FEFEL, a citizen of the United States, residing at New York, in the county of New York and State of New York, have invented certain new and useful Improvements in Driving Mechanism for Bicycles; and I do hereby declare the following to be a full, clear, and exact description of the invention, such as will enable others skilled in the art to which it appertains to make and use the same.

My invention relates to improvements in velocipedes, tricycles, bicycles, and other wheeled vehicles; and the objects of my improvement are to facilitate the propulsion of these vehicles, particularly bicycles, and to improve the construction and relative arrangement of machines of these classes. I attain these objects by the construction and mechanism shown in the accompanying drawings, in which—

Figure 1 is a section on the line $x$ $x$ of Fig. 2, parts being shown in elevation. Fig. 2 is a section on the line $y$ $y$ of Fig. 1, and Fig. 3 is a view in elevation showing the slotted-face driving-disk and roller-disk in operative position.

Similar letters refer to similar parts throughout the several views.

Sleeved upon the lower end of the saddle-supporting post C is the double forked bracket G and in the lower ends of which are journaled slotted-face driving-disks L L, provided with journals made integral therewith, and upon their outer ends the pedal-cranks $g$ $g$ are secured. Upon the inner faces of the said disks are radial slots M M, and upon the outer faces of the roller-disks K K and journaled therein are the rollers $k$ $k$, adapted to move in $s^r$ ä radial slots as the slotted-face driving disks L L are revolved. These roller-disks K K are centrally journaled one upon each end of the driven ball-bearing shaft P, which passes through the lower end of the supporting saddle-post C and through the hanger or housing Q, within which the balls, tracks for the balls of the ball-bearings are held in position, and the larger portion of the driven ball-bearing shaft P inclosed, concealed, and excluded from dust and moisture.

Rigidly secured to one of the roller-disks K upon its periphery is the sprocket-wheel W, over which the sprocket-chain travels to a similar sprocket upon the periphery of the corresponding roller-disk secured to the end of the driven ball-bearing shaft for propelling the rear wheel of the bicycle. (Not shown upon the drawings.)

The propelling mechanism for driving the rear wheel of my improved vehicle is a duplication of that above described, and a detailed description of said rear propelling mechanism is not deemed to be required in order that those persons familiar with the construction of bicycles and the class of devices to which my invention belongs might make the same. Furthermore, the mode or manner of operating my improved driving mechanism for bicycles and other vehicles is obviously and manifestly so apparent from the description of its construction hereinbefore given that a detailed description of the function and operation of the parts thereof is wholly unnecessary.

Having fully described my invention, what I claim, and desire to secure by Letters Patent, is—

In a bicycle the combination of a bracket, having a tubular intermediate clamping portion adapted to encircle the saddle-post the free edges of said portion being connected by bolts, said bracket being provided with outwardly and downwardly curved arms, driving-disk having six radial slots formed in the inner faces thereof, being provided with studs or journals revolubly mounted in the free extremities of said arms, pedal-cranks upon said journals or studs, a hanger upon the extremity of the saddle-post, a shaft journaled therein, disks upon the extremity of said shaft carrying rollers, which engage the slots in said driving-disks, a sprocket-wheel mounted on one of the roller-disks, and having chain connections with a sprocket-wheel on the axle of the driving-wheel, as specified.

In testimony whereof I affix my signature in presence of two witnesses.

HENRY H. FEFEL.

Witnesses:
 M. F. HAMMEL,
 M. M. FLYNN.